United States Patent
Iwasa et al.

(10) Patent No.: US 7,748,492 B2
(45) Date of Patent: Jul. 6, 2010

(54) ELECTRIC POWER STEERING DEVICE

(75) Inventors: Souichi Iwasa, Osaka (JP); Shingo Ougita, Osaka (JP)

(73) Assignee: JTEKT Corporation, Osaka (JP)

( * ) Notice: Subject to any disclaimer, the term of this patent is extended or adjusted under 35 U.S.C. 154(b) by 425 days.

(21) Appl. No.: 10/592,147

(22) PCT Filed: Mar. 8, 2005

(86) PCT No.: PCT/JP2005/004405

§ 371 (c)(1),
(2), (4) Date: Sep. 8, 2006

(87) PCT Pub. No.: WO2005/085040

PCT Pub. Date: Sep. 15, 2005

(65) Prior Publication Data

US 2007/0193819 A1 Aug. 23, 2007

(30) Foreign Application Priority Data

Mar. 9, 2004 (JP) .............................. 2004-065971

(51) Int. Cl.
*B62D 5/04* (2006.01)
(52) U.S. Cl. ...................... 180/444; 74/409; 74/388 PS
(58) Field of Classification Search ................. 180/444, 180/443; 74/409, 388 PS, 395, 396, 411, 74/425

See application file for complete search history.

(56) References Cited

U.S. PATENT DOCUMENTS

| | | | |
|---|---|---|---|
| 6,763,738 B1 * | 7/2004 | Tsutsui et al. ............ | 74/388 PS |
| 6,805,017 B2 * | 10/2004 | Chikaraishi et al. ...... | 74/388 PS |
| 7,401,678 B2 * | 7/2008 | Yuasa et al. ................ | 180/444 |
| 7,455,149 B2 * | 11/2008 | Segawa et al. ............. | 180/444 |
| 2001/0002630 A1 | 6/2001 | Watanabe et al. | |
| 2001/0040067 A1 | 11/2001 | Murakami et al. | |
| 2002/0056588 A1 * | 5/2002 | Kuze et al. .................. | 180/444 |

(Continued)

FOREIGN PATENT DOCUMENTS

EP  1 714 851 A1  10/2006

(Continued)

*Primary Examiner*—Lesley Morris
*Assistant Examiner*—Maurice Williams
(74) *Attorney, Agent, or Firm*—Rabin & Berdo, PC (57) ABSTRACT

An electric power steering device (1) is provided which transmits output rotation of an electric motor for generating a steering assist force (16) to a steering mechanism (64) via a driving gear (22) and a driven gear (21). A housing (8) has a support hole (28) for supporting one end portion (23) of a shaft (20) co-rotatable with the driving gear (22) via a bearing (26) in such a manner as to permit the one end portion (23) to be offset toward the driven gear (21) radially of the driving gear (22). A biasing member (33) which biases the driving gear (22) toward the driven gear (21) includes an arcuate main portion (47) fitted around an outer peripheral surface (58) of an outer ring (36) of the bearing (26) and opposed to an inner peripheral surface (42) of the support hole (28). A pair of movement restriction portions (50, 51) which restrict circumferential movement of the main portion (47) are respectively provided at a pair of arc ends (48, 49) of the main portion (47). A resilient tongue (52) which biases the driving gear (22) toward the driven gear (21) via the bearing (26) is provided only on one of the movement restriction portions (50).

5 Claims, 5 Drawing Sheets

U.S. PATENT DOCUMENTS

| | | | |
|---|---|---|---|
| 2003/0127277 A1 | 7/2003 | Murakami et al. | |
| 2004/0094352 A1* | 5/2004 | Shibata et al. | 180/444 |
| 2004/0163879 A1* | 8/2004 | Segawa | 180/444 |
| 2004/0182188 A1 | 9/2004 | Nakamura et al. | |
| 2004/0245040 A1* | 12/2004 | Eda et al. | 180/444 |
| 2005/0236222 A1* | 10/2005 | Chikaraishi | 180/444 |

FOREIGN PATENT DOCUMENTS

| | | |
|---|---|---|
| JP | 59-133364 | 9/1984 |
| JP | 2001-71918 | 3/2001 |
| JP | 2001-108025 | 4/2001 |
| JP | 2001-146169 | 5/2001 |
| JP | 2001-163229 | 6/2001 |
| JP | 2002-96749 | 4/2002 |
| JP | 2002-098198 | 4/2002 |
| JP | 2002-130234 | 5/2002 |
| JP | 2002-249056 | 9/2002 |
| JP | 2003-28153 | 1/2003 |
| JP | 2003-063425 | 3/2003 |
| JP | 2003-278844 | 10/2003 |
| JP | 2004-203154 | 7/2004 |
| JP | 2004-224303 | 8/2004 |

* cited by examiner

ELECTRIC POWER STEERING DEVICE

TECHNICAL FIELD

The present invention relates to an electric power steering device which transmits output rotation of a steering assist electric motor to a steering mechanism via a driving gear and a driven gear meshed with the driving gear.

BACKGROUND ART

Electric power steering devices of the aforesaid type employ a worm shaft as a driving gear and a worm wheel as a driven gear (see, for example, Japanese Unexamined Patent Publication No. 2001-108025).

In general, the worm shaft and the worm wheel should be meshed with each other with proper backlash for reduction of a torque loss. However, when vibrations are inputted from a road surface to tires while traveling under bad road conditions, for example, rattle occurs between the worm shaft and the worm wheel due to the backlash.

In order to minimize the torque loss and generation of the rattle, the amount of the backlash should be adjusted within a predetermined machining accuracy. That is, a proper combination of the worm shaft and the worm wheel is selected according to variations in the dimensional accuracies of the worm shaft and the worm wheel to provide a proper combinational accuracy when the worm shaft and the worm wheel are assembled (a so-called matching operation). However, this operation is cumbersome, thereby increasing production costs.

The aforementioned worm wheel is usually formed of a synthetic resin. In this case, the backlash amount is liable to be changed by the wear of the teeth of the worm wheel and the expansion and contraction of the worm wheel due to a temperature change, moisture absorption and the like.

To cope with this, it is proposed that the worm shaft is supported so as to be offset toward the worm wheel, and resiliently biased toward the worm wheel to suppress the torque loss and eliminate the backlash (see, for example, Japanese Unexamined Patent Publication No. 2001-146169). More specifically, a corrugated plate spring having an arcuate shape is provided between a bearing which supports a support shaft of the worm shaft and a bearing retention hole of a housing, and the worm shaft is biased toward the worm wheel by the biasing force of the corrugated plate spring.

However, where the corrugated plate spring is used for generating the biasing force radially of the bearing, the corrugated plate spring should be formed with a sufficient amount of undulations. As a result, the device has an increased in size. On the other hand, it is demanded to increase durability of the device.

Similar problems are also found in electric power steering devices utilizing a common gear mechanism other than the worm shaft and the worm wheel.

It is an object of the present invention to provide an electric power steering device which permits to bias a driving gear resiliently toward a driven gear thereof accompanied by reduction in size and improvement in durability.

DISCLOSURE OF THE INVENTION

According to a preferred mode of the present invention to achieve the aforesaid object, there is provided an electric power steering device which transmits output rotation of an electric motor for generating a steering assist force to a steering mechanism via a driving gear and a driven gear meshed with the driving gear. The electric power steering device comprises a housing which accommodates the driving gear and the driven gear, a biasing member for resiliently biasing the driving gear toward the driven gear, and a pair of bearings which rotatably support opposite end portions of a shaft co-rotatable with the driving gear, respectively. The housing has a support hole which supports one of the end portions of the shaft via a corresponding one of the bearings in such a manner as to permit the one end potion to be offset toward the driven gear radially of the driving gear, and a recess formed in an inner peripheral surface of the support hole. The recess has a bottom and a pair of interior walls opposed to each other circumferentially of the support hole. The biasing member includes a main portion of an arcuate cross section fitted around an outer peripheral surface of an outer ring of the corresponding bearing in opposed relation to the inner peripheral surface of the support hole, a pair of circular arc ends provided on the main portion, a pair of movement restriction portions provided at the respective circular arc ends of the main portion, and a resilient tongue which biases the driving gear toward the driven gear via the corresponding bearing. The pair of movement restriction portions are engaged with the respective interior walls of the recess to restrict movement of the main portion in corresponding circumferential directions. The resilient tongue extends from only one of the movement restriction portions and is received by the bottom of the recess.

If a pair of resilient tongues for biasing the driving gear toward the driven gear were provided on the respective movement restriction portions, a stress load to be exerted on one of the resilient tongues would be reduced, and a stress load to be exerted on the other resilient tongue would be correspondingly increased. The present mode enables eliminating the resilient tongue which receives the relatively increased stress load, and arranging only the resilient tongue which receives the relatively reduced stress, to improve the durability. Further, the main portion can be formed of a thin plate, so that the size reduction of the device can be achieved.

BEST MODE FOR IMPLEMENTING THE INVENTION

Preferred embodiments of the present invention will be described with reference to the attached drawings.

Figure 1:
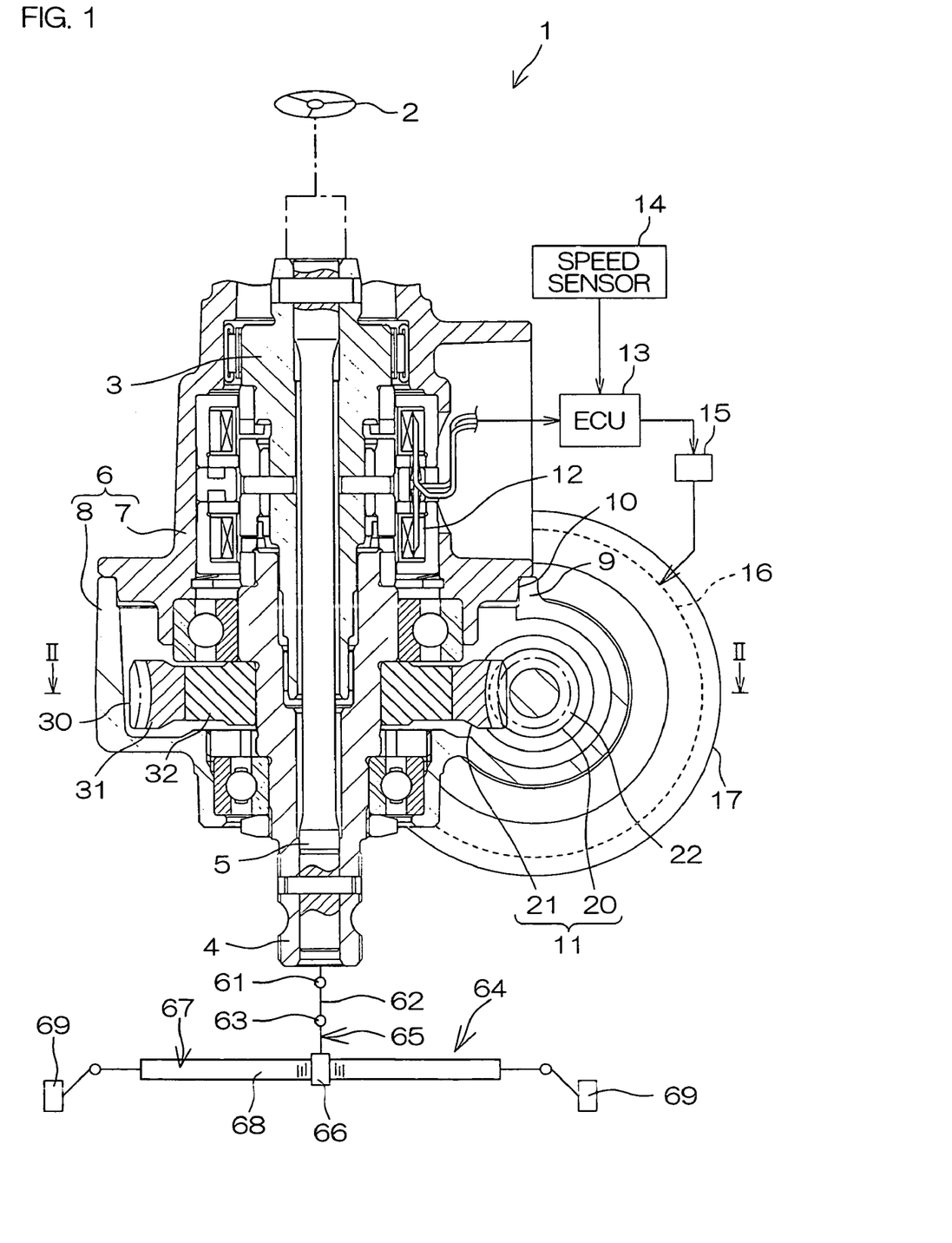
FIG. 1 is a schematic sectional view of an electric power steering device according to one embodiment of the present invention.
Figure 2:
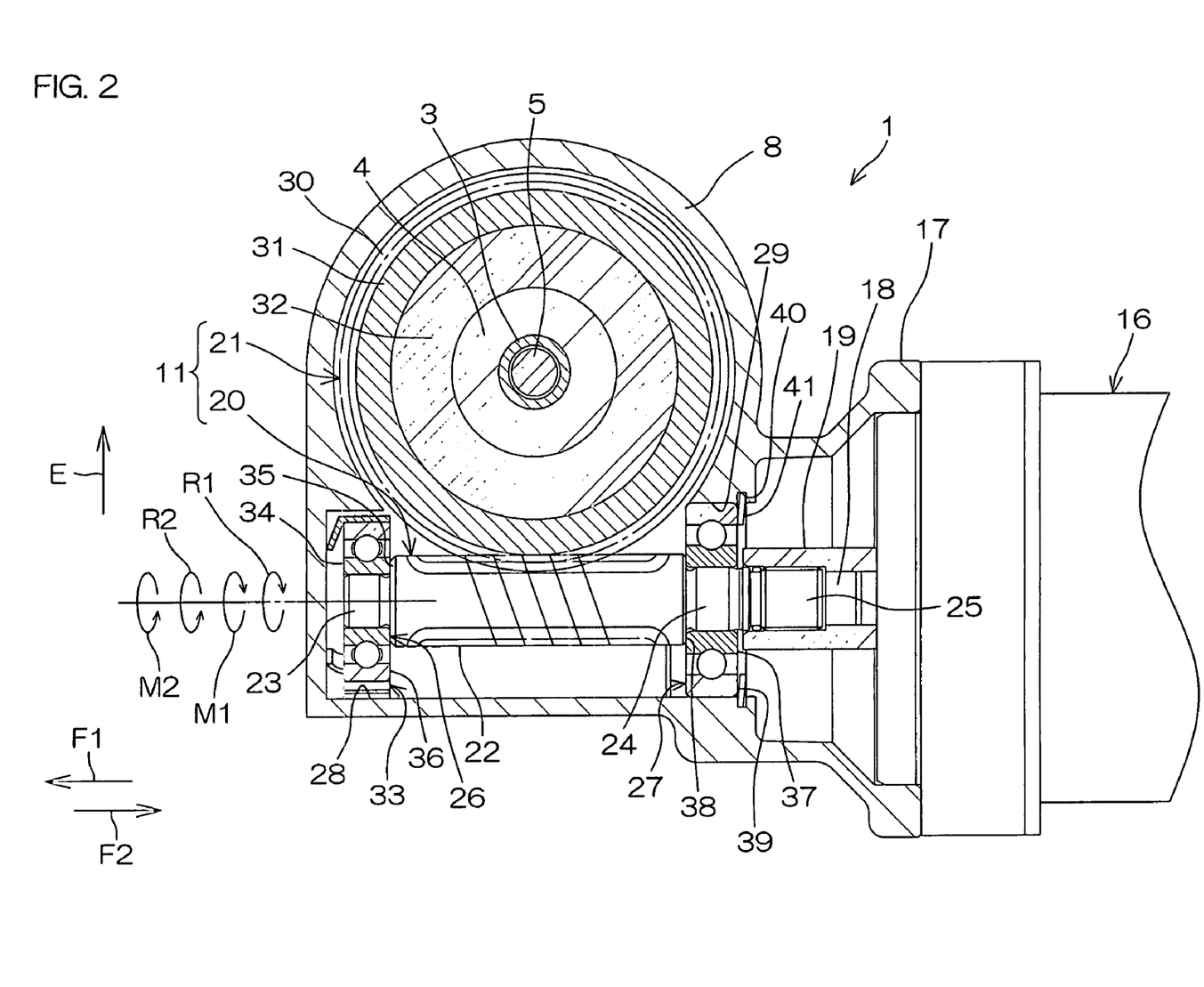
FIG. 2 is a sectional view taken along a line II-II in FIG. 1.

FIG. 1 is a schematic sectional view of an electric power steering device 1 according to one embodiment of the present invention. FIG. 2 is a sectional view taken along a line II-II in FIG. 1.

Referring to FIG. 1, the electric power steering device 1 includes a first steering shaft 3 defined as an input shaft coupled to a steering member 2 such as a steering wheel, and a second steering shaft 4 defined as an output shaft coupled to a steering mechanism 64 via a universal joint 61, an intermediate shaft 62 and a universal joint 63. The first and second steering shafts 3,4 are coaxially coupled to each other via a torsion bar 5.

The steering mechanism 64 comprises, for example, a rack and pinion mechanism. More specifically, the steering mechanism 64 includes a pinion 66 provided around a pinion shaft 65 coupled to the universal joint 63, and a rack 68 provided on an axially slidable rack shaft 67 extending transversely of a motor vehicle.

When the first and second steering shafts 3, 4 are rotated by operation of the steering member 2, the rotation is transmitted to the steering mechanism 64 to turn vehicle wheels 69.

A housing 6 which accommodates the first and second steering shafts 3, 4 is composed of, for example, aluminum. The housing 6 includes a first housing 7 and a second housing 8 engaged with each other. The first housing 7 is also called "sensor housing".

More specifically, the second housing 8 has a cylindrical shape. An upper edge portion 9 of the second housing 8 is engaged with an annular step 10 provided around a lower edge portion of the first housing 7. The second housing 8 accommodates a worm gear mechanism 11 defined as a speed reduction mechanism, while the first housing 7 accommodates a torque sensor 12.

The torque sensor 12 detects a relative rotation displacement between the first steering shaft 3 and the second steering shaft 4 via the torsion bar 5, and applies a detection signal to an electronic control unit 13 (hereinafter also referred to as "ECU 13"). The ECU 13 calculates the value of a steering torque applied to the steering member 2 on the basis of the detection signal applied from the torque sensor 12.

The ECU 13 controls the driving of a steering assist electric motor 16 via a driver 15 on the basis of the calculated steering torque value, a vehicle speed detection signal applied from a vehicle speed sensor 14 and the like. When the electric motor 16 is driven, the output rotation of the electric motor 16 is transmitted to the second steering shaft 4 via the worm gear mechanism 11. The output of the motor transmitted to the second steering shaft 4 is further transmitted to the steering mechanism 64 via the intermediate shaft 62. Thus, a driver's steering operation is assisted.

As shown in FIG. 2, a motor housing of the electric motor 16 is fixed to an annular flange 17 of the second housing 8.

Referring to FIGS. 1 and 2, the worm gear mechanism 11 includes a worm 22 defined as a driving gear and a worm wheel 21 defined as a driven gear meshed with the worm 22 for power transmission.

The worm wheel 21 is coupled to an axially middle portion of the second steering shaft 4 in a co-rotatable and axially immovable manner. The worm wheel 21 includes an annular tooth member 31 of a synthetic resin having teeth 30 provided on an outer circumference thereof, and an annular retention member 32 of a metal formed integrally with the annular tooth member 31 inserted in the annular tooth member 31 during injection molding. The annular retention member 32 is connected to the second steering shaft 4, for example, by press fitting.

Referring to FIG. 2, a worm shaft 20 is disposed coaxially with an output shaft 18 of the electric motor 16. The worm shaft 20 has a first end portion 23 and a second end portion 24 axially spaced from each other. The worm 22 is provided at an intermediate portion between the first and second end portions 23, 24 of the worm shaft 20. The first end portion 23 of the worm shaft 20 is located relatively far from the electric motor 16, and the second end portion 24 is located relatively close to the electric motor 16.

A connection portion 25 provided at the second end portion 24 of the worm shaft 20 is co-rotatably coupled to the output shaft 18 of the electric motor 16 each other via a joint 19, for example, for serration engagement or spline engagement.

The first end portion 23 of the worm shaft 20 is rotatably supported by a first bearing 26 retained in a first support hole 28 of the second housing 8 via a biasing member 33. An inner ring 34 of the first bearing 26 is engaged co-rotatably with the first end portion 23 of the worm shaft 20. The inner ring 34 of the first bearing 26 abuts to an annular step 35 formed around the worm shaft 20 for positioning thereof, whereby movement of the inner ring 34 in one axial direction along the worm shaft 20 is restricted. An outer ring 36 of the first bearing 26 is non-rotatably retained in the first support hole 28 via the biasing member 33.

The second end portion 24 of the worm shaft 20 is rotatably supported by a second bearing 27 retained in a second support hole 29 of the second housing 8. An inner ring 37 of the second bearing 27 is engaged co-rotatably with the second end portion 24 of the worm shaft 20. The inner ring 37 of the second bearing 27 abuts to an annular step 38 formed around the worm shaft 20 for positioning thereof, whereby movement of the inner ring 37 in the other axial direction along the worm shaft 20 is restricted. An outer ring 39 of the second bearing 27 is non-rotatably retained in the second support hole 29.

The second housing 8 has a retention groove 40 formed in the vicinity of the second support hole 29, and a stop ring 41 composed of, for example, a corrugated plate is fitted in the retention groove 40. The stop ring 41 abuts to one end face of the outer ring 39 of the second bearing 27 and, as a result, movement of the second bearing 27 in the one axial direction is restricted.

The first and second bearings 26, 27 rotatably supporting the worm shaft 20 are, for example, ball bearings.

Figure 3:
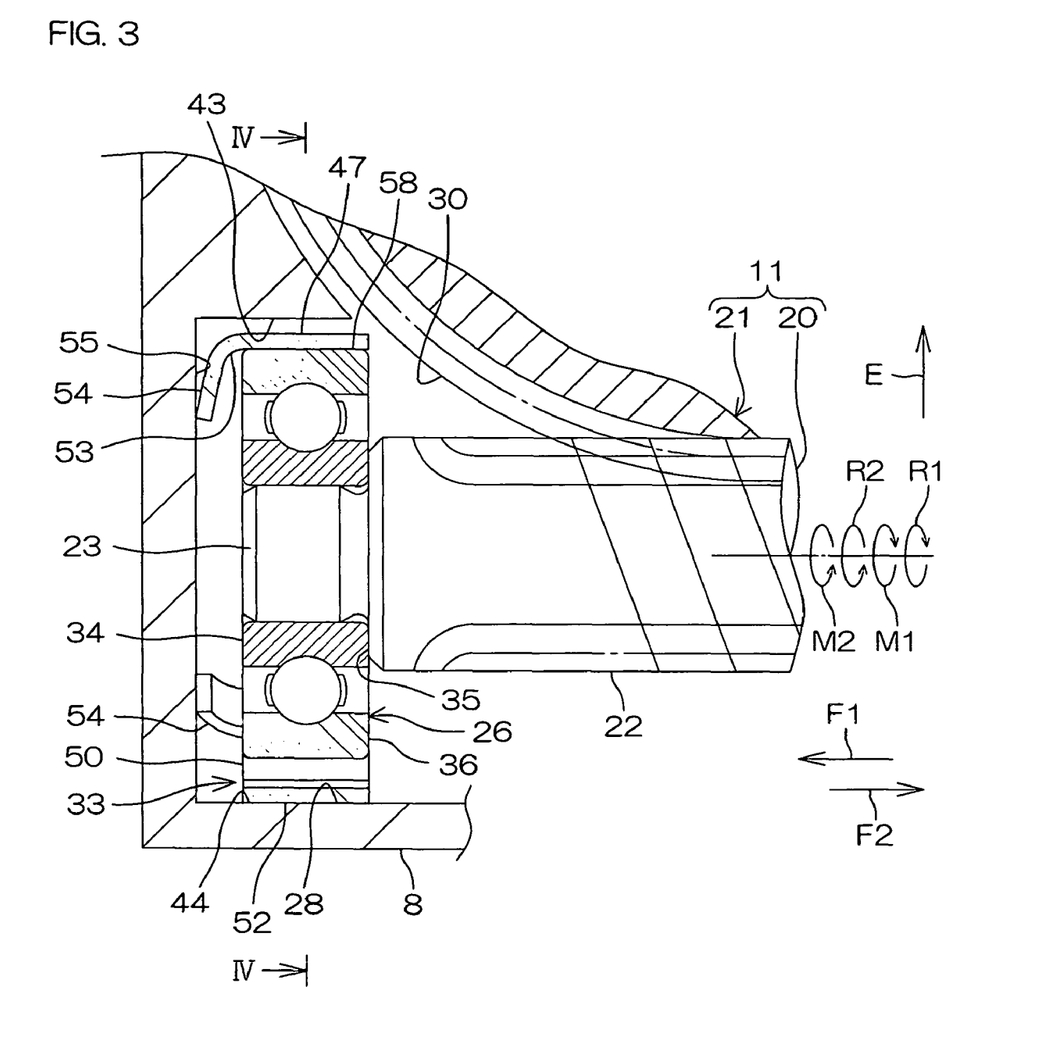
FIG. 3 is an enlarged view of a portion around a biasing member of FIG. 2.
Figure 4:
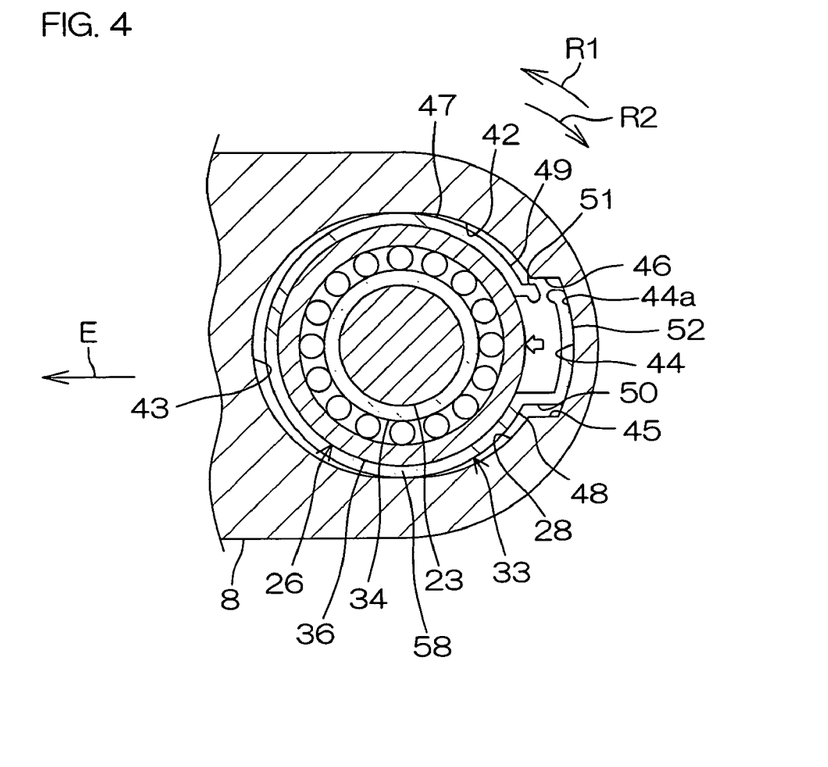
FIG. 4 is a sectional view taken along a line IV-IV in FIG. 3.
Figure 5:
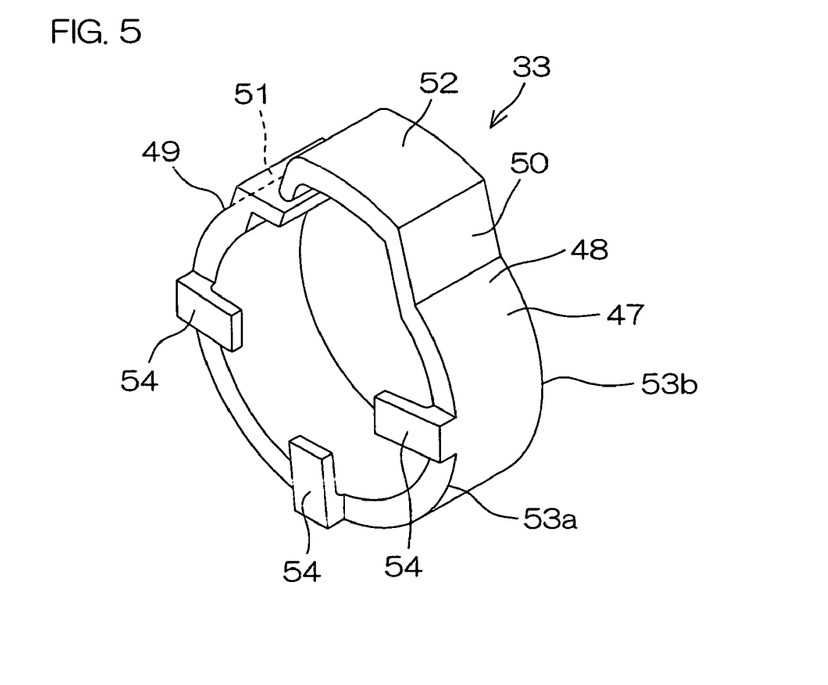
FIG. 5 is a perspective view of the biasing member.

FIG. 3 is an enlarged view of a portion around the biasing member 33 of FIG. 2. FIG. 4 is a sectional view taken along a line IV-IV in FIG. 3, and FIG. 5 is a perspective view of the biasing member 33. Referring to FIGS. 3 and 4, the first support hole 28 of the second housing 8 supports the first support shaft 23 via the biasing member 33 and the first bearing 26 in such a manner as to permit the first support shaft 23 to be offset toward the worm wheel 121 radially of the worm shaft 20. The biasing member 33 resiliently biases the worm shaft 20 toward the worm wheel 21 to eliminate backlash between the worm shaft 20 and the worm wheel 21 and apply a pressure to the first and second bearings 26, 27.

More specifically, a first recess 43 is provided in one portions of an inner peripheral surface 42 of the first support hole 28 opposed to each other in an offset direction E in which the worm shaft 20 is offset toward the worm wheel 21 radially of the worm shaft 20 and a second recess 44 is provided in the other portions. The second recess 44 has a pair of interior walls 45, 46 opposed to each other circumferentially of the first support hole 28. The interior walls 45, 46 each extend in the direction for crossing the circumference of the second recess 44 (in the offset direction E in this embodiment).

Referring to FIG. 5, the biasing member 33 is a thin plate member formed, for example, of metal plate working. The biasing member 33 includes an arcuate main portion 47. The main portion 47 has one end 48 and the other end 49 defined as a pair of arc ends, and a pair of side edges 53a, 53b.

The biasing member 33 further includes first and second rotation restriction portions 50, 51 defined as a pair of movement restriction portions respectively provided at the one end 48 and the other end 49. The biasing member 33 further includes a first resilient tongue 52 defined as a radially cantilevered biasing member extending only from the first rotation restriction portion 50, one of the movement restriction portions, and second resilient tongues 54 defined as an axially biasing portion provided on one 53a of the side edges of the main portion 47.

The one end 48 of the main portion 47 is herein defined as a front end as seen in a first direction R1 of the rotation of the worm shaft 20, and the other end 49 is herein defined as a rear end as seen in the first rotation direction R1. The first resilient tongue 52 extends only from the first rotation restriction portion 50 provided at the one end 48 defined as the front end as seen in the first rotation direction R1.

Referring again to FIGS. 3 and 4, the main portion 47 of the biasing member 33 is engaged with an outer peripheral surface 58 of the outer ring 36 of the first bearing 26 in a relatively non-rotatable manner, and opposed to the inner peripheral surface 42 of the first support hole 28. The main portion 47 surrounds at least a half of the circumference of the outer ring 36 of the first bearing 26, and is movable integrally with the first bearing 26 in the offset direction E. The first and second rotation restriction portions 50, 51 respectively extend from the corresponding one end 48 and the other end 49 of the main portion 47 to prevent relative rotation of the biasing member 33 with respect to the first support hole 28. The first and second rotation restriction portions 50, 51 are respectively engageable with the corresponding interior walls 45, 46 of the second recess 44 of the first support hole 28, and restrict movement of the main portion 47 in corresponding circumferential directions by the engagement.

The first resilient tongue 52 is located on a front end side of the main portion 47 as seen in the direction of the rotation of the worm shaft 20 when an axial component of a driving counter force received by the worm shaft 20 from the worm wheel 21 is directed away from the electric motor 16 (leftward in FIG. 3).

In this embodiment, the worm 22 of the worm shaft 20 is formed in a right-hand screw. Therefore, when the electric motor 16 rotates the worm shaft 20 clockwise (counterclockwise as seen in FIG. 4), the axial component of the driving counter force acts in such a direction as to move the worm shaft 20 away from the electric motor 16. Therefore, the first resilient tongue 52 is located on the side of the front end (the one end 48) of the main portion 47 as seen in the rotation direction when the electric motor 16 rotates the worm shaft 20 clockwise.

The first resilient tongue 52 extends from the first rotation restriction portion 50 at the one end 48 to one circumferential direction of the main body 47. The first resilient tongue 52 is bent with its outer peripheral surface received by a bottom 44a of the second recess 44 of the first support hole 28 to generate a biasing force (resilient counter force) in the offset direction E as indicated by an outlined arrow. The biasing force is applied to the first end portion 23 of the worm shaft 20 via the first rotation restriction portion 50, the main portion 47 and the first bearing 26 to bias the worm shaft 20 toward the worm wheel 21.

Referring to FIGS. 4 and 5, the second resilient tongues 54 receive one end face of the outer ring 36 of the first bearing 26, and bias the first and second bearings 26, 27 in the one axial direction to apply a pressure to the first and second bearings 26, 27. A plurality of the second resilient tongues 54 (e.g., three second resilient tongues) are provided equidistantly circumferentially of the main portion 47 respectively. The second resilient tongues 54 extend radially inward of the main portion 47 respectively, and are interposed between one flat end face 55 of the second housing 8 and the one end face of the first bearing 26.

The second resilient tongues 54 are received by the one end face 55 of the second housing 8 respectively, and bent axially to generate a biasing force (resilient counter force). The biasing force is applied to the first bearing 26 from the outer ring 36 of the first bearing 26 and further to the second bearing 27 via the worm shaft 20 as shown in FIG. 2. Thus, the worm shaft 20 is biased toward the electric motor 16.

Referring to FIGS. 3 and 4, the outer ring 36 of the first bearing 26 is received by the second resilient tongues 54 in this embodiment, though the one end face of the outer ring of the first bearing is conventionally received by an annular receiving portion formed in the one end face of the housing. This permits the one end face 55 of the second housing 8 to form a flat surface, thereby reducing costs.

Further, the worm shaft 20 is resiliently supported by the biasing member 33, so that the worm shaft 20 can be smoothly moved when the driving of the electric motor 16 is started. This improves steering feeling. Furthermore, with the main portion 47 and the second resilient tongues 54 engaged with the outer ring 36 of the first bearing 26, the biasing member 33 is prevented to be inadvertently disengaged from the first bearing 26 while assembling. This facilitates the assembling.

Since the first resilient tongue 52 is cantilevered, a sufficient bend margin can be provided. As a result, the biasing force of the first resilient tongue 52 can be set within a sufficient range, thereby increasing the design flexibility.

Next, the operation of the electric power steering device 1 will be described. When the worm shaft 20 is rotatively driven in the first rotation direction R1 (counterclockwise in FIG. 4) by the driving of the electric motor 16, a rotation force M1 and a thrust force F1 are respectively generated as the rotational component and axial component of the driving counter force on the worm shaft 20. The rotation force M1 acts in the first rotation direction R1, while the thrust force F1 acts axially of the worm shaft 20 in such a direction as to move the worm shaft 20 away from the electric motor 16.

At this time, the thrust force F1 is transmitted to the first and second rotation restriction portions 50, 51 from the worm shaft 20 via the first bearing 26, the second resilient tongues 54 and the main portion 47. The rotation force M1 is transmitted to the main portion 47 via the first bearing 26, whereby the second rotation restriction portion 51 is made to abut on the interior wall 46 of the second recess 44 of the first support hole 28. That is, the second rotation restriction portion 51 receives both the rotation force M1 and the thrust force F1, but the first rotation restriction portion 50 receives only the thrust force F1. Therefore, the rotation force M1 and the thrust force F1 do not simultaneously act on the first rotation restriction portion 50.

On the other hand, when the worm shaft 20 is rotatively driven in the second rotation direction R2 (clockwise in FIG. 4) by the driving of the electric motor 16, a rotation force M2 and a thrust force F2 are respectively generated as the rotational component and axial component of the driving counter force on the worm shaft 20.

At this time, the thrust force F2 is transmitted to the stop ring 41 from the worm shaft 20 via the second bearing 27. Further, the rotation force M2 is transmitted to the main portion 47 via the first bearing 26, whereby the first rotation restriction portion 50 is made to abut on the interior wall 45 of the second recess 44 of the first support hole 28. That is, the first rotation restriction portion 50 receives only the rotation force M2 out of the rotation force M2 and the thrust force F2.

Therefore, the rotation force M2 and the thrust force F2 do not simultaneously act on the first rotation restriction portion 50.

In this embodiment, the worm shaft 20 is biased toward the worm wheel 21 by the first resilient tongue 52 of the biasing member 33 as described above. Since the main portion 47 of the biasing member 33 is formed of a thin plate, the size reduction of the device can be achieved.

Further, the first resilient tongue 52 for biasing the worm shaft 20 toward the worm wheel 21 is provided only on one of the rotation restriction portions 50, 51 of the biasing member 33 having a smaller stress load, so that the durability can be significantly improved. That is, the rotation force and the thrust force of the worm shaft 20 simultaneously act on the second rotation restriction portion 51, but do not simultaneously act on the first rotation restriction portion 50. Since the first resilient tongue 52 is provided on the first rotation restriction portion 50, the rotation force and the thrust force of the worm shaft 20 and the biasing force of the first resilient tongue 52 simultaneously act on neither of the rotation restriction portions 50 and 51. As a result, the stress loads to be applied to the respective rotation restriction portions 50, 51 are sufficiently reduced to significantly improve the durability.

From another viewpoint, the direction of the radial component (not shown) of the driving counter force received by the worm shaft 20 from the worm wheel 21 differs depending on the directions R1, R2 of the rotation of the worm shaft 20. If first resilient tongues 52 are respectively provided on the first and second rotation restriction portions 50, 51, a load to be exerted on the second rotation restriction portion 51 via the corresponding first resilient tongue by an influence of the radial component of the driving counter force generated when the worm shaft 20 is rotated in the first rotation direction R1 tends to be greater than a load to be exerted on the first rotation restriction portion 50 via the corresponding first resilient tongue 52 by an influence of the radial component of the driving counter force generated when the worm shaft 20 is rotated in the second rotation direction R2. As a result, the load to be exerted on the second rotation restriction portion 51 will be excessively increased. In this embodiment, on the contrary, the first resilient tongue does not extend from the second rotation restriction portion 51, so that the load to be exerted on the second rotation restriction portion 51 is not excessively increased.

Figure 6:
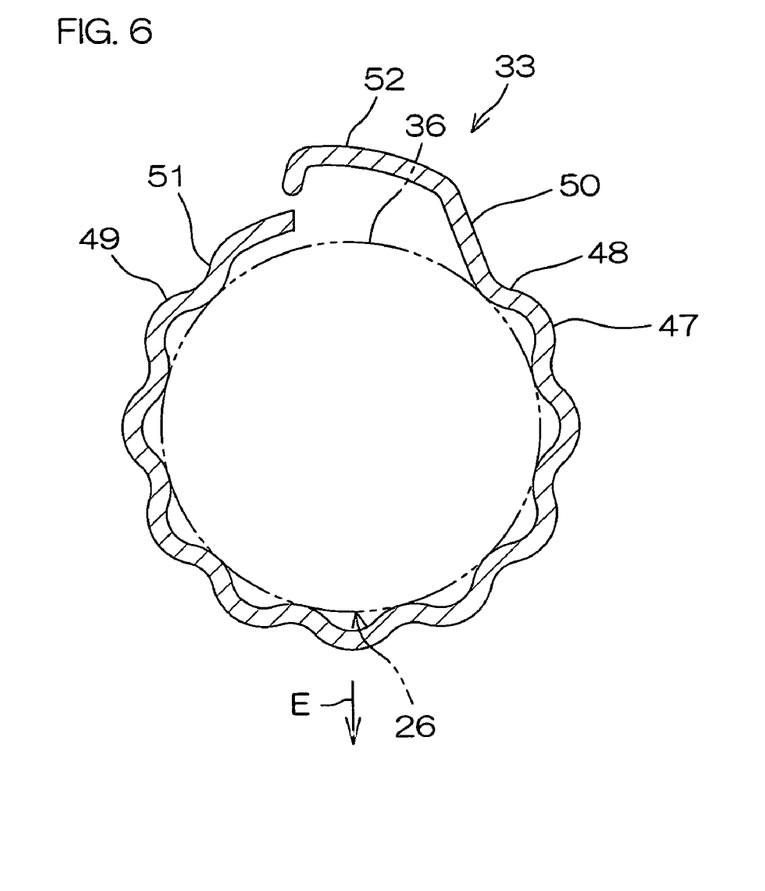
FIG. 6 is a schematic sectional front view of a biasing member according to another embodiment of the present invention.

FIG. 6 is a schematic sectional front view of a biasing member 33 according to another embodiment of the present invention. Hereinafter, an arrangement different from that of the embodiment shown in FIGS. 1 to 5 will be explained and components corresponding to those shown in FIGS. 1 to 5 will be denoted by the same reference characters as in FIGS. 1 to 5, and will not be explained. Referring to FIG. 6, a feature of this embodiment is that the main portion 47 has a corrugated shape.

In this case, the main portion 47 fills a minute fitting clearance defined with respect to the outer ring 36 of the first bearing 26, so that the main portion 47 can assuredly follow the movement of the first bearing 26 occurring due to the offset of the worm shaft 20 in the offset direction E. Since the main portion 47 and the outer ring 36 of the first bearing 26 contact each other with a sufficient contact area, the first bearing 26 is stably retained. As a result, relative sliding of the main portion 47 with respect to the outer ring 36 of the first bearing 26 can be suppressed, thereby assuredly reducing the noise.

Figure 7:
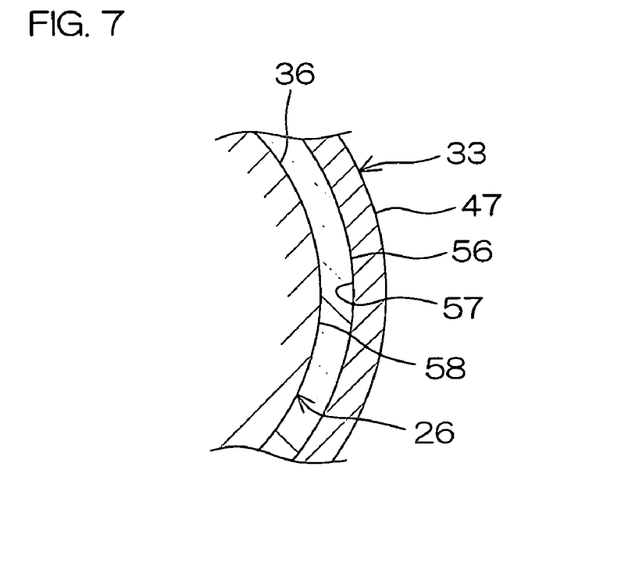
FIG. 7 is a sectional view of a major portion according to further another embodiment of the present invention.

FIG. 7 is a sectional view of a major portion according to further another embodiment of the present invention. Referring to FIG. 7, a feature of this embodiment is that a resilient member 56 is provided between the main portion 47 of the biasing member 33 and the outer ring 36 of the first bearing 26. Exemplary materials for the resilient member 56 include a resin and a rubber. The resilient member 56 is provided integrally with the main portion 47. More specifically, the resilient member 56 is bonded to an inner peripheral surface 57 of the main portion 47 (where the resilient member 56 is composed of a rubber, the bonding is achieved, for example, by vulcanization).

In this case, the relative sliding of the main portion 47 of the biasing member 33 with respect to the outer ring 36 of the first bearing 26 can be more assuredly suppressed, thereby further reducing the noise.

The resilient member 56 may be bonded to the outer peripheral surface 58 of the outer ring 36 of the first bearing 26 thereby to be provided integrally with the first bearing 26. Alternatively, the resilient member 56 may be formed of an annular item member provided separately from the first bearing 26 and the biasing member 33, respectively. The main portion 47 of the biasing member 33 may have a corrugated shape.

The present invention is not limited to the embodiments described above. For example, the worm 22 of the worm shaft 20 may have a left-handed screw. In this case, the first resilient tongue 52 of the biasing member 33 is provided on the second rotation restriction member 51. Further, the number of the second resilient tongues 54 of the biasing member 33 may be one or two, or may be four or more. Further, the biasing member 33 may be provided on the second bearing 27. Common gears such as spur gears, helical gears and hypoid gears may be used as the driving gear and the driven gear.

While the present invention has thus been described in greater detail by way of the specific embodiments thereof, skilled persons who have understood the foregoing will easily come up with variations, modifications and equivalents of the embodiments. Therefore, the scope of the present invention is defined by the appended claims and their equivalents.

This application corresponds to Japanese Patent Application No. 2004-65971 filed with the Japanese Patent Office on Mar. 9, 2004, the disclosure of which is incorporated herein by reference.

What is claimed is:

1. An electric power steering device which transmits output rotation of an electric motor for generating a steering assist force to a steering mechanism via a driving gear and a driven gear meshed with the driving gear, the electric power steering device comprising:

a housing which accommodates the driving gear and the driven gear;

a biasing member for resiliently biasing the driving gear toward the driven gear; and a pair of bearings which rotatably support opposite end portions of a shaft co-rotatable with the driving gear, respectively, wherein the housing has a support hole which supports one of the end portions of the shaft via a corresponding one of the bearings in such a manner as to permit the one end portion to be offset toward the driven gear radially of the driving gear, and a recess formed in an inner peripheral surface of the support hole, the recess having a bottom and a pair of interior walls opposed to each other circumferentially of the support hole;

the biasing member includes a main portion of a circular arc cross section fitted around an outer peripheral surface of an outer ring of the corresponding bearing in opposed relation to the inner peripheral surface of the support hole, a pair of circular arc ends provided on the main portion, and a pair of movement restriction portions provided at the respective circular arc ends of the main portion, only one of the pair of movement restriction portions having a resilient tongue which biases the driving gear toward the driven gear via the corresponding bearing, the one of the movement restriction portions having a smaller stress load than the other of the movement restriction portions;

the pair of movement restriction portions are engaged with the respective interior walls of the recess to restrict movement of the main portion in corresponding circumferential directions;

the resilient tongue extends from the one of the movement restriction portions and is received by the bottom of the recess;

the shaft comprises a worm shaft;

the driving gear comprises a worm provided around the worm shaft;

the driven gear comprises a worm wheel;

the worm shaft has a first end portion located relatively far from the electric motor and a second end portion located relatively close to the electric motor;

the one end portion of the shaft comprises the first end portion of the worm shaft;

the worm shaft is rotated in first and second rotation directions which are opposite from each other;

a driving counter force to be received by the worm shaft from the worm wheel when the worm shaft is rotated in the first rotation direction includes an axial component which acts axially of the worm shaft to move the worm shaft away from the electric motor;

the pair of circular arc ends of the main portion comprise front and rear ends with respect to the first rotation direction; and the one movement restriction portion from which the resilient tongue extends is provided at the front end as seen in the first rotation direction.

2. The electric power steering device as set forth in claim 1, wherein the biasing member further includes a pair of side edges provided on the main portion, and a resilient tongue provided on one of the side edges for biasing the worm shaft toward the electric motor via the corresponding bearing.

3. The electric power steering device as set forth in claim 1, wherein the main portion is formed in a corrugated shape.

4. The electric power steering device as set forth in claim 1, further comprising a resilient member interposed between the main portion and the outer ring of the corresponding bearing.

5. An electric power steering device for transmitting output rotation of an electric motor via a worm wheel and a worm around a worm shaft to a steering mechanism for generating a steering assist force, the worm shaft having a first end portion relatively far from the electric motor and a second end portion relatively close to the electric motor, and rotating in a first rotation direction and, a second rotation direction opposite to the first rotation direction, comprising:

a first bearing rotatably supporting the first end portion of the worm shaft;

a housing accommodating the worm wheel and the worm shaft, the housing having a support hole, a recess being formed in an inner peripheral surface of the support hole with a bottom and a pair of interior walls opposing to each other; and a biasing member disposed between the first bearing and the support hole for resiliently biasing the worm shaft toward the worm wheel, the biasing member including:

an arcuate main portion fitted around an outer peripheral surface of an outer ring of the first bearing in opposed relation to the inner peripheral surface of the support hole, a pair of circular arc ends provided on the main portion, the pair of circular arc ends including a front end and a rear end with respect to the first rotation direction, and a pair of movement restriction portions each provided at a respective circular arc end of the main portion, the pair of movement restriction portions being engaged with the respective interior walls of the recess to restrict movement of the main portion in corresponding circumferential directions, only one of the pair of movement restriction portions having a resilient tongue which biases the worm shaft toward the worm wheel via the first bearing, the resilient tongue extending from the one of the movement restriction portions and from only the front end in the first rotation direction, and being received by the bottom of the recess, the one of the movement restriction portions having a smaller stress load than the other of the movement restriction portions.

\* \* \* \* \*